United States Patent
Dacutanan (10) Patent No.: US 10,637,908 B2
(45) Date of Patent: *Apr. 28, 2020

(54) PARALLEL AND SEQUENTIAL EXECUTION OF AUTOMATED ONLINE CHARGING TEST PROCEDURES

(71) Applicant: T-Mobile USA, Inc., Bellevue, WA (US)

(72) Inventor: Julius Dacutanan, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,510

(22) Filed: Jan. 18, 2019

(65) Prior Publication Data

US 2019/0158572 A1 May 23, 2019

Related U.S. Application Data

(63) Continuation of application No. 15/476,807, filed on Mar. 31, 2017, now Pat. No. 10,187,450.

(Continued)

(51) Int. Cl.
| | |
|---|---|
| *H04M 1/24* | (2006.01) |
| *H04M 3/08* | (2006.01) |
| *H04M 3/22* | (2006.01) |
| *H04L 29/08* | (2006.01) |
| *H04L 12/50* | (2006.01) |
| *H04L 12/26* | (2006.01) |
| *H04W 4/24* | (2018.01) |
| *H04W 4/50* | (2018.01) |

(Continued)

(52) U.S. Cl.
CPC .............. *H04L 67/06* (2013.01); *H04L 12/14* (2013.01); *H04L 12/1403* (2013.01); *H04L 12/50* (2013.01); *H04L 43/50* (2013.01); *H04L 67/02* (2013.01); *H04L 67/16* (2013.01); *H04M 15/00* (2013.01); *H04M 15/41* (2013.01); *H04M 15/43* (2013.01); *H04M 15/53* (2013.01); *H04M 15/66* (2013.01); *H04M 15/70* (2013.01); *H04M 15/725* (2013.01); *H04M 15/73* (2013.01); *H04M 15/74* (2013.01); *H04M 15/8214* (2013.01); *H04M 15/8228* (2013.01); *H04W 4/24* (2013.01); *H04W 4/50* (2018.02); *H04L 2012/5625* (2013.01)

(58) Field of Classification Search
USPC ............ 379/1.01, 10.01, 10.03, 26.01, 29.02
See application file for complete search history.

(56) References Cited

U.S. PATENT DOCUMENTS

| | | | |
|---|---|---|---|
| 5,539,802 A * | 7/1996 | De Caluwe ........... | H04M 3/248 379/13 |
| 5,729,588 A | 3/1998 | Chin et al. | |

(Continued)

*Primary Examiner* — Quoc D Tran
(74) *Attorney, Agent, or Firm* — Perkins Coie LLP (57) ABSTRACT

Systems and methods are described herein for performing automated testing of online charging systems associated with telecommunications networks. In some embodiments, the systems and methods utilize various components associated with an online charging system, such as an event mediator, to convert data associated with test cases to be simulated by the online charging system (e.g., data from spreadsheets) into various test requests actionable during the online charging system under when simulating the test cases.

19 Claims, 6 Drawing Sheets

Related U.S. Application Data (60) Provisional application No. 62/344,353, filed on Jun. 1, 2016.

(51) Int. Cl.
*H04L 12/14* (2006.01)
*H04M 15/00* (2006.01)
*H04L 12/70* (2013.01)

(56) References Cited

U.S. PATENT DOCUMENTS

| | | |
|---|---|---|
| 5,809,108 A | 9/1998 | Thompson et al. |
| 5,940,472 A | 8/1999 | Newman et al. |
| 6,430,410 B1 | 8/2002 | Staber |
| 7,231,210 B1 | 6/2007 | Croak et al. |
| 7,680,250 B1 | 3/2010 | Zilles et al. |
| 10,187,450 B2 * | 1/2019 | Dacutanan ............... H04W 4/24 |
| 2008/0130850 A1 | 6/2008 | Bencheqroun et al. |
| 2011/0143754 A1 | 6/2011 | Jiang et al. |
| 2016/0063119 A1 * | 3/2016 | Tevnan ............... G06F 16/9535 717/130 |

* cited by examiner

| Test case | Run Selected | Run All | Charging Parameters | | | | Account Before | | Expected Results | | | Simulation Results | | | Test Result |
|---|---|---|---|---|---|---|---|---|---|---|---|---|---|---|---|
| | | | Subscriber no. | Location | Other Party no. | Other params | Subscription | Buckets/ Counters | Account After | Call Setup | SMS Notification | Account After | Call Setup | SMS Notification | |
| sample | | | 2063556066 | Home 310260/120531 38/2165 5161164 | 42564968 90 | calltype= MO time= units-5 | plan-Simple ChoicePrepaid addon-offers= multiline-onv= tether-7 | ma=100 | ma=100 | setup-Success Charged units=5 redir-annc= | | ma=100 | setup-Success Charged units=5 redir-annc= | | PASS |
| ... | | | ... | ... | ... | ... | ... | ... | ... | ... | ... | ... | ... | ... | ... | sample_test_suite_v0.3

PARALLEL AND SEQUENTIAL EXECUTION OF AUTOMATED ONLINE CHARGING TEST PROCEDURES

This application is a continuation of U.S. patent application Ser. No. 15/476,807 filed Mar. 31, 2017, entitled PARALLEL AND SEQUENTIAL EXECUTION OF AUTOMATED ONLINE CHARGING TEST PROCEDURES, now U.S. Pat. No. 10,187,450; which claims priority to U.S. Provisional Patent Application No. 62/344,353, filed on Jun. 1, 2016, entitled PARALLEL AND SEQUENTIAL EXECUTION OF AUTOMATED ONLINE CHARGING TEST PROCEDURES, both of which are hereby incorporated by reference in their entireties.

BACKGROUND

Typically, network carriers provide their subscribers with a variety of options for subscribing to voice, messaging, content, and/or data services provided by an associated telecommunications network. These options include different rate plans, add-ons, and so on. In order to retain their current subscribers and bring in new subscribers, the network carrier, among other things, may modify their existing plans and replace old plans with new plans.

These updates cause tariff logic changes in an online charging system (e.g., an Intelligent Network) associated with the telecommunications network. The online charging system provides real-time call control, rating, metering, notification, and/or CDR generation functions for the network. For example, the online charging systems performs a rating/metering function for every call, message, data communication or other session or event within the network.

In order to determine the proper control and charging of calls, sessions, events, and so on within the network, the online charging system is tested after every logic change is made to the various plans provided to subscribers of the network carrier. Testing after logic changes, which are often manually determined, enables the network carrier to ensure subscriber experiences are satisfactory, calls and other events are charged correctly, revenue loss is prevented, and so on.

However, conventional testing of online charging systems is a manual process. Given the amount of test cases that may arise after a tariff logic change to one or more plans provided by the network carrier (e.g., many different call variable combinations such as subscription variables, balance, call type, location, time, and so on), these manual processes are inefficient and ineffective with respect to correctly, accurately, and completely testing the online charging systems.

BRIEF DESCRIPTION OF THE DRAWINGS

Embodiments of the disclosed technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for performing automated testing of online charging systems associated with telecommunications networks. In some embodiments, the systems and methods utilize various components associated with an online charging system, such as an event mediator, to convert data associated with test cases to be simulated by the online charging system (e.g., data from spreadsheets) into various test requests actionable by the online charging system when simulating the test cases.

For example, the event mediator may convert a row of a spreadsheet, corresponding to a test case, into a provisioning request, a message request, a voice call request, a validation request, and so on, that is received by the online charging system, which simulates charging the test case based on actions performed in response to the requests. Once the simulation is complete, the online charging system provides a test result to the event mediator, including a call setup summary, an account query result, logs, and any notifications, and populates the row of the spreadsheet with a result of the test case that is based on the specific scenario.

In some embodiments, the systems and methods include an event mediation module that converts one or more rows of a spreadsheet into one or more online charging testing requests, wherein each row of the spreadsheet is associated with a test case and includes one or more variables to be tested by the online charging system, and wherein the online charging testing requests include: provisioning flow requests to be tested by the online charging system, messaging flow requests to be tested by the online charging system, data session flow requests to be tested by the online charging system, voice call flow requests to be tested by the online charging system, and specific call and account parameters to be validated at the end of online charging simulation. The systems and methods may also include a call simulation module that initiates the voice call flow requests to be tested by the online charging system into voice charging requests received by the online charging system.

The systems and methods, therefore, automate testing procedures for online charging systems of networks, enabling a network carrier to quickly and effectively test the online charging system after tariff logic changes are made to various call and data plans offered by the network carrier to its subscribers.

Various embodiments of the system will now be described. The following description provides specific details for a thorough understanding and an enabling description of these embodiments. One skilled in the art will understand, however, that the system may be practiced without many of these details. Additionally, some wellknown structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

Figure 1:
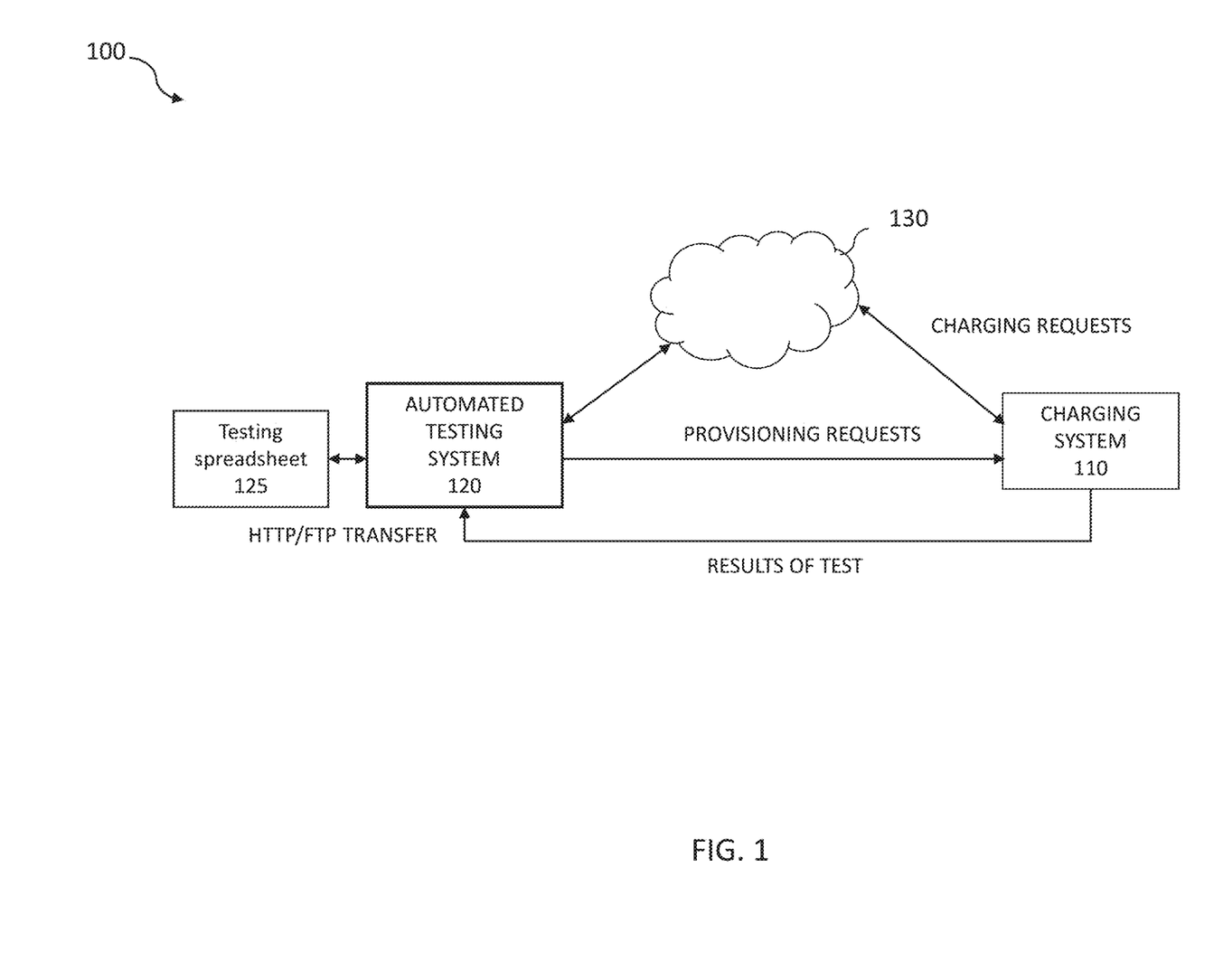
FIG. 1 is a block diagram illustrating a suitable computing environment for testing an online charging system.

FIG. 1 is a block diagram illustrating a suitable computing environment 100 for testing an online charging system 110. As described herein, the online charging system 110 manages and implements real-time call control, rating, metering, notification, and CDR generation functions for a network. An automated testing system 120 communicates with the charging system 110 directly or over a network 130, such as an SS7 network, Intranet, the Internet, and so on.

The automated testing system 120 is configured to receive data (such as a testing spreadsheet 125 of data via an HTTP/FTP transfer) associated with test cases to be simulated by the online charging system 110, and convert the test data to actionable requests received by the online charging system. The online charging system 110 operates using the received requests, which simulates operation of the online charging system under the test cases of which the requests are derived. At the end of the charging simulation, the automated testing system 120 includes the call setup summary in the test case result.

In some cases, the online charging system 110 generates account results, logs, and/or notifications for the requests (e.g., results of the simulation), and is queried by the automated testing system 120. The automated testing system 120 may convert the query results together with the call setup summary, and populate the spreadsheet with the results of the simulation of the online charging system 110 under the test cases.

FIG. 1 and the discussion herein provide a brief, general description of a suitable computing environment 100 in which the automated testing system 120 can be supported and implemented. Although not required, aspects of the automated testing system 120 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as an SS7 network, a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

In some embodiments, the automated testing system 120 and/or the online charging system 110 may include network communication components that enable the devices to communicate with remote servers or other portable electronic devices by transmitting and receiving wireless signals using a licensed, semi-licensed, or unlicensed spectrum over communications network, such as network 130. In some cases, the communication network 130 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 130 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network Examples of Automation Testing of an Online Charging System As described herein, in some embodiments, the systems and methods facilitate the automated testing of online charging systems, such as online charging system 110, after logic changes are made to calling, messaging, and/or data plans for subscribers of network carriers that provides services via telecommunications networks.

At a high level, the automated testing system 120 performs the following operations when simulating the online charging system 110 with a test case, such as a test case represented by a row of data within the testing spreadsheet 125. The system 120 executes the test by provisioning a test number account for the test case, including buckets and counters for the test case, simulates the call of the test case, analyzes the call setup, and collects associated data logs, notifications and CDRs generated by the online charging system 110. Once test results are collected, the system 120 may compare the call setup summary, account balance and counters, notifications with expected results specified by the tester, and determines if the test case was successful.

For each test case simulation, a number of different variables are used as input. Example variables include:

The call type, such as voice, call forward, Wi-Fi call, messaging, content, data, tethering and so on;

The subscriber roaming location, such as country, partners, and so on;

The dialed number, including country code, short codes, toll free numbers, and so on;

The date and time of the call request;

The Handset type that placed the call;

The rate plan, add-on, and account-type subscription (e.g., single line, multi-line, language, and so on);

The account status, bucket balance, counter values, and so on.

It follows that, given the number of call simulation variables, a number of example expected test result variables may be used as input and may be validated by the automated test system include:

The call setup allowed and metered;

The call setup allowed and toll free;

A call being rejected due to insufficient balance of barred activity;

A call being rejected due to network error;

A call being redirected;

Data browsing being blocked and/or redirected;

Data browsing speed being throttled;

A mid-call drop due to depleted balance;

An announcement language or music ringtone being played during call setup;

A notification being sent to a subscriber or to an external application server after a threshold or limit is reached;

Account bucket balance being deducted or refunded;

Account usage counters incremented;

Account suspended or expired after the logic update;

Online charging system CDR is generated with accurate call information after the call simulation; and so on.

Given the seemingly endless number of variables to test and results to obtain, for each and every tested call, utilizing the automated testing system 120 to perform one or more simulations of test cases in parallel or simultaneously enables a network carrier to efficiently test modified and new rate plans in short time periods and with few resources.

The automated testing system 120, which may include or provide a tariff automation tool, is configured to isolate the online charging system 110 and simulate provisioning and test call requests received by the online charging system 110 (and instead of using real or manual procedures, such as testers making many (e.g., thousands) of different phone calls to test the system 110).

By generating and performing simulations, the system 120 automates the call testing procedures. For example, the system 120 may assign test numbers to test cases, provision accounts, make test calls, analyze and validate call flows, collect logs and CDR files, validate accounts after a simulated call, compare test results to expected results, determine the success (e.g., pass or fail) of a call and so on.

The system 120 also provides the option to either execute test rows in sequence using a single test number or to scale the testing procedures to hundreds or thousands of test cases executed in parallel, using a spreadsheet table as a universal test case data structure that facilitates simple test case design, conversion of data to comma-separated values format (CSV) files, and so on. For example, the spreadsheet 125 received by the automated testing system 120 may include multiple rows, where each row includes variables for a single test case.

By receiving test case data via the spreadsheet 125 as input, the system 120 may generate testing numbers, transaction IDs, and so on, and run multiple test cases simultaneously with the online charging system 110. Therefore, in some embodiments, the automated testing system 120 may test the online charging system 110 using spreadsheet data as test case inputs, and an event mediator to convert the data to call requests, along with a network message simulator to emulate voice calls as appearing from a voice network, with respect to the online charging system 110.

Figure 2:
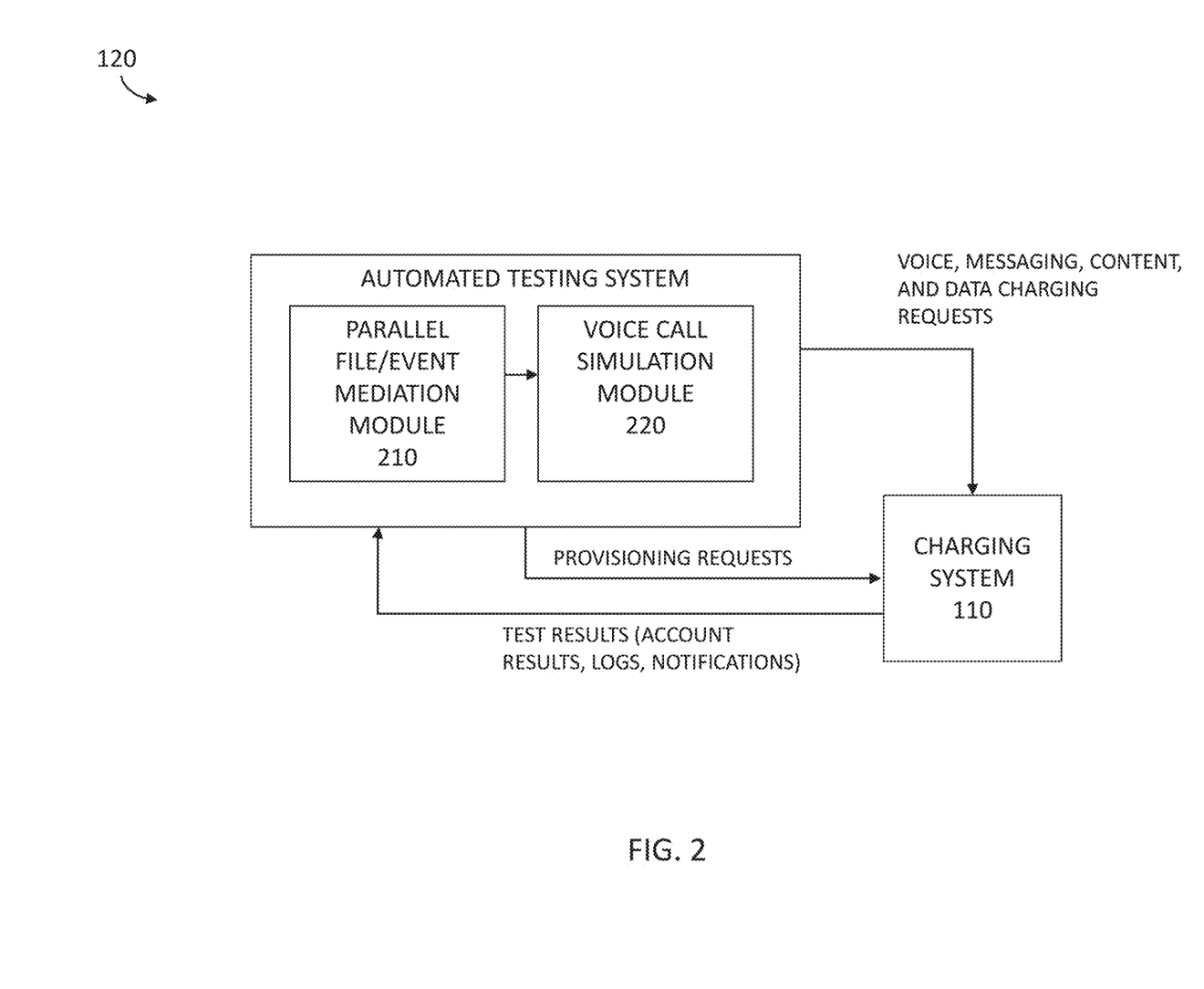
FIG. 2 is a block diagram illustrating the components of an automated testing system.

FIG. 2 is a block diagram illustrating the components of the automated testing system 120. The automated testing system 120 may include functional modules that are implemented with a combination of software (e.g., executable instructions, or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the automated testing system 120 may include a file/event mediation module 210 and voice call simulation module 220.

In some embodiments, the file/event mediation module 210, or EMM, is configured and/or programmed to convert one or more rows of a spreadsheet into one or more online charging testing requests. For example, the event mediation module 210 may convert input variables within the one or more rows of the spreadsheet 125 into a predefined sequence of flow requests to be tested at the online charging system 110, such as by converting multiple different rows of the spreadsheet 125 into online charging testing requests to be executed by the online charging system 110 sequentially and/or in parallel to one another.

As described herein, the spreadsheet 125 includes rows that contain different variables for a test case to be simulated by the online charging system 110. The spreadsheet 125 may be designed to facilitate the input and design of test cases, including call variables, such as call setup and account balance or counter result variables to be validated. The spreadsheet 125 may provide pick lists to input sample values, may apply global or default variables across some or all test cases, and so on.

For example, each row of the spreadsheet 125 includes a first set of variables associated with charging parameter for a test case, a second set of variables associated with account tariff logic parameters for the test case, and a third set of variables associated with an expected result or expected notification of simulating operation of the charging system 110 with the test case. In some cases, wildcard characters maybe used as input to variable values such as expected notification verbiage to indicate a less strict success criteria when automated testing system 120 performs the comparison to the actual test result.

In some cases, the spreadsheet 125 may include user-selectable buttons, such as buttons that facilitate user input to run a single test case, to run all test case rows sequentially, to run some or all test case rows in parallel or simultaneously, and other user-designated sequences.

Figure 3:
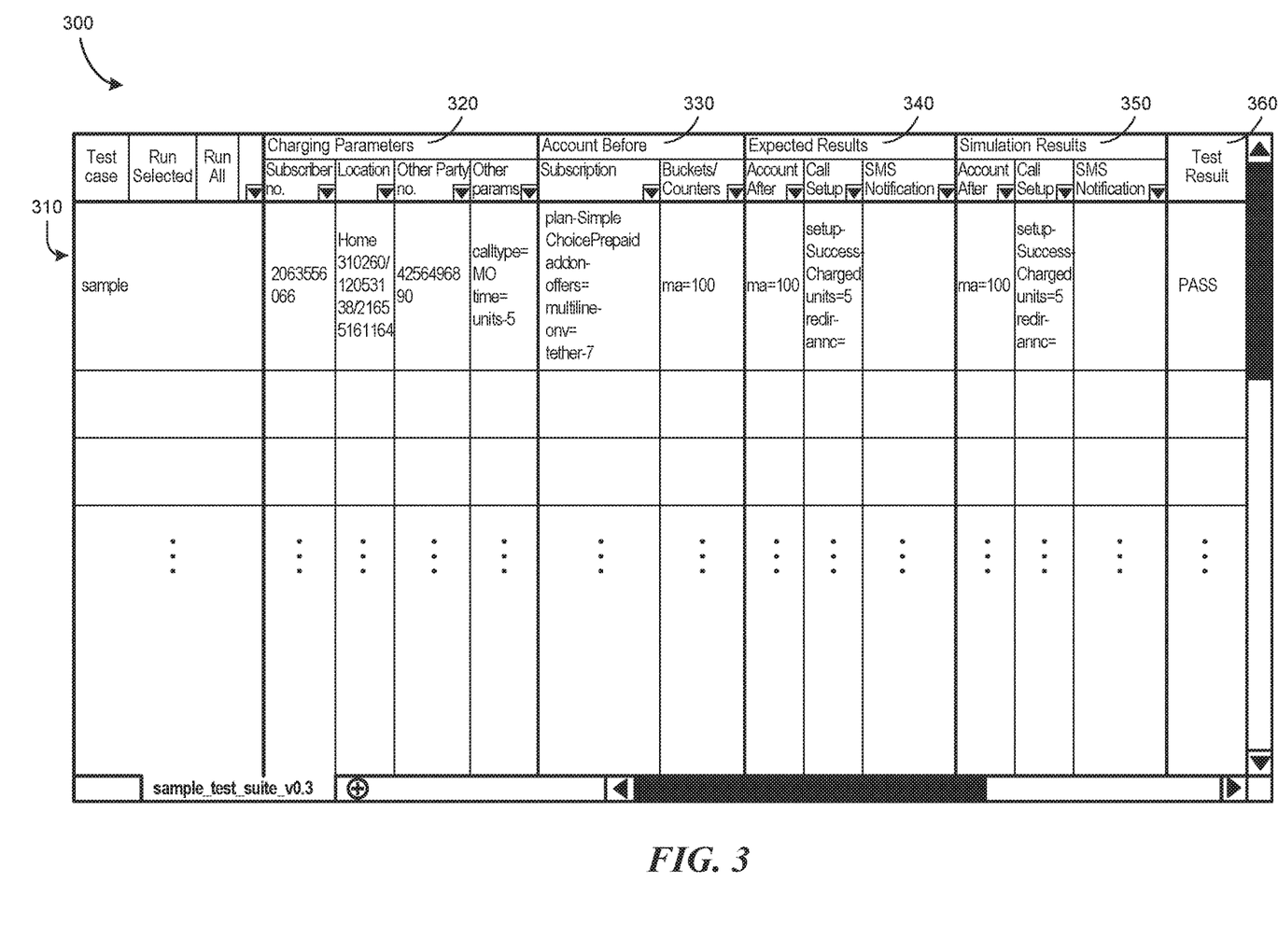
FIG. 3 is a display diagram illustrating an example spreadsheet that is input to the automated testing system.

FIG. 3 is a display diagram illustrating an example spreadsheet 300 that is input to the automated testing system 120. As depicted, the spreadsheet 300 includes a row 310 associated with a "sample" test case. The row 310 contains many different variables for the test case, including:

Charging parameters 320, which include the subscriber number, the location of the subscriber, the called party number, the call type, and so on;

Account information 330, which include subscription or plan details, buckets/counters (when applicable), and so on; and Expected results 340, which include details associated with expected results of the test case being simulated by the online charging system 110, such as the status of the account after the call request was simulated, call setup results, and so on.

The spreadsheet 350 also includes variables associated with actual results 350, 360 of the test case, which will be discussed in detail herein.

Referring back to FIG. 2, the event mediation module 210, after a simulation of a test case has been completed, may receive from the online charging system 110 a account query result, logs, and notifications that includes results of performing simulations of the online charging system 110 using the online charging testing requests, convert the information to be provided to the spreadsheet 125, and update the spreadsheet 125 with the CDR information.

As shown, when the spreadsheet 125 includes expected results data for performing simulations of the charging system 110 using a test case of which the online charging testing requests are derived, the event mediation module 210 may compare the actual test results with the expected results data (e.g., variables 350), and determine whether the online charging system 110 operates correctly under the test case (e.g., a pass/fail variable 360).

In some cases, the event mediation module 210 converts spreadsheet data 125, such as data provided via an HTTP/FTP transfer, into various different online charging testing requests that target different aspects of the online charging system 110. For example, the testing requests, or call requests, include provisioning flow requests to be tested by the online charging system 110, messaging flow requests to be tested by the online charging system 110, data session flow requests to be tested by the online charging system 110; and/or voice call flow requests 110 to be tested by the online charging system 110.

Therefore, the event mediation module 210 converts a test case row into an online charging testing procedure that includes one or more of provisioning requests, call testing requests, and/or validation of expected results. The event mediation module 210 may include various aspects of various mediation platforms, such as the Ericsson Multi Mediation (EMM) platform. Among other things, the systems and methods described herein improve upon conventional mediation platforms by including the spreadsheet data conversion components and processes described herein, which enable the systems and methods to perform automated testing of online charging systems using test case data from spreadsheet data (CSV files).

In some embodiments, the voice call simulation module 220 is configured and/or programmed to provision voice call flow requests to be tested by the online charging system 110 into voice charging requests received and acted upon by the online charging system 110. For example, the voice call simulation module 220 may simulate or emulate the voice call flow requests generated by the event mediation module 210 as voice charging requests originating from a voice network, with respect to the online charging system 110. The voice call simulation module 220 may include some aspects of the Message Generator and Traffic Simulator™ (MGTS), by Ixia, which emulates SS7 and PSTN entities and application databases, or other simulators configured to test various networks and systems.

For example, after converting a test case to a voice call request, the event mediation module 210 transfers the voice call request to the voice call simulation module 220, which emulates a voice call originating from a voice network with respect to the system 110.

Figure 4:
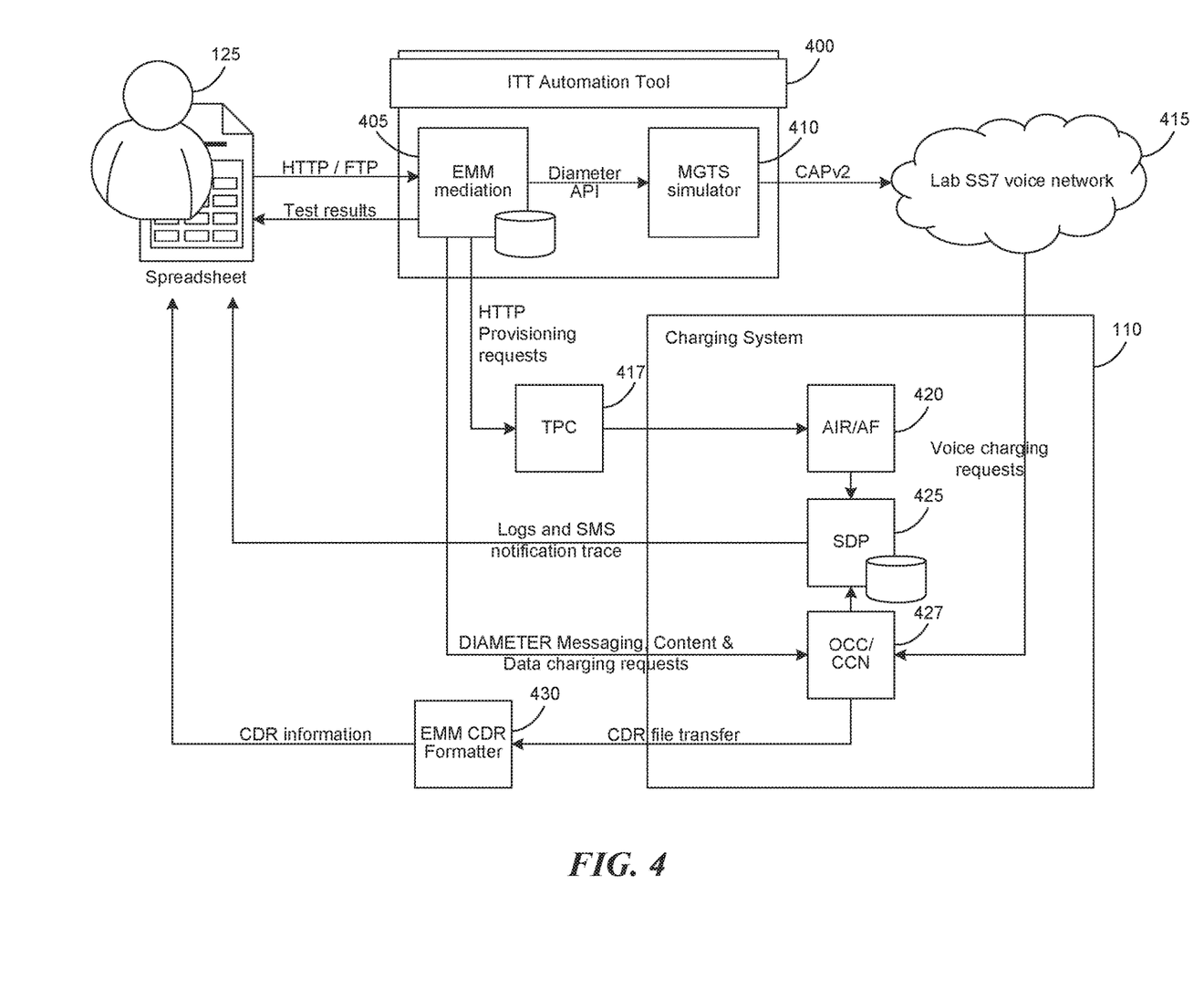
FIG. 4 is a block diagram illustrating flows of data between components of a tariff automation tool and components of a charging system.

To illustrate the online charging system 110 performing simulations of test cases, FIG. 4 presents flows of data between components of a tariff automation tool 400 (e.g., provided by the automated testing system 120) and components of the online charging system 110.

As described herein, the automation tool 400 receives or otherwise accesses rows of variables from the spreadsheet 125 using an EMM mediation component 405 that has been configured to convert the spreadsheet data into various requests to be sent to the online charging system 110 during testing. The EMM component 405 transfers any voice call requests to an MGTS simulator 410, which emulates an SS7 voice network 415 with respect to the online charging system 110.

The online charging system 110 receives the different requests at various components, and simulates the test cases. For example, the system 110 may receive provisioning requests from an operator 417 (e.g., provisioning gateway TPC), and receive voice call requests from the network 415.

An online credit control (OCC) component 427, or charging control node (CCN), of the system is configured to receive charging requests from the EMM mediation component 405, as well as voice call or charging requests from the voice network 415 which then forwards the request to the SDP component 425. The SDP component 425 may store in various databases rate plan information, subscriber account type information, status information, balance information, usage information, subscription information, and so on. In response to the requests, the OCC component 427 and SDP component 425 performs various charging functions, and provides the call instruction back to the automation tool 400. The SDP component 425 may generate a notification to the subscriber or to an external application server when a threshold is crossed. At the end of the charging session or event, the OCC component 427 generates CDR data that can be validated by the automation tool 400.

An account function component 420 (AIR/AF) is configured to receive provisioning requests from the EMM mediation component 405. In response to the requests, the AF 420 tests the provisioning of accounts based on the logic changes, and provides results data to the SDP 425. Once the data is collected, the SDP 425 sends CDR data, such as logs and/or SMS notification trace data, to the spreadsheet 425 and/or back to the EMM mediation component 405. The EMM 405 may convert the CDR data 425, and enter the data into the spreadsheet 125, as described herein.

Figure 5:
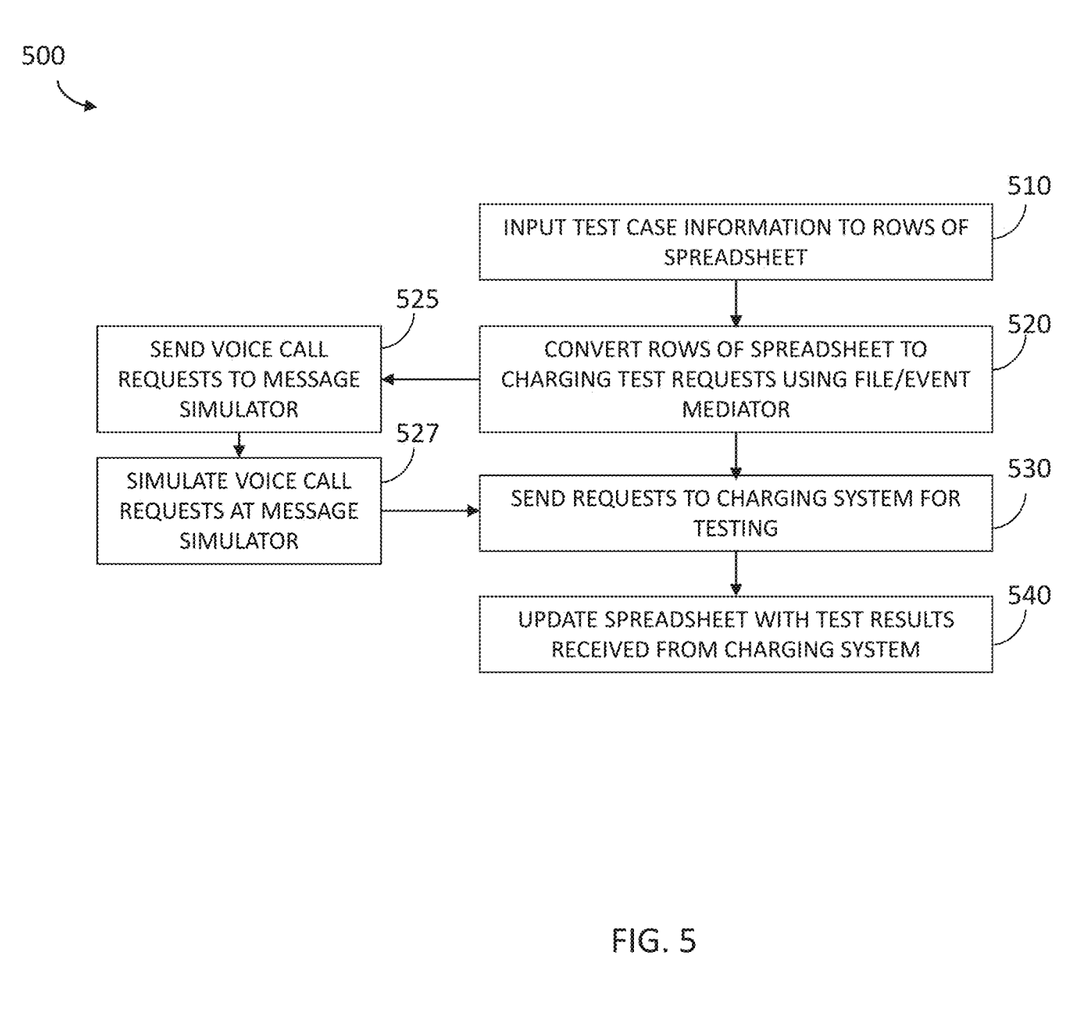
FIG. 5 is a flow diagram illustrating a method for testing a charging system.

As described herein, the automated testing system 120 may perform various operations or methods when performing automated testing of online charging systems 110. FIG. 5 is a flow diagram illustrating a method 500 for testing a charging system. The method 500 may be performed by the automated testing system 120, and, accordingly, is described herein merely by way of reference thereto. It will be appreciated that the method 500 may be performed on any suitable hardware.

In operation 510, a test case is input into the spreadsheet 125 as a row of variables. For example, the row of variables may include a first set of variables associated with a charging parameter for a test case, a second set of variables associated with account tariff logic parameters for the test case, and a third set of variables associated with an expected result of simulating operation of the charging system with the test case.

In operation 520, the system 120 converts one or more rows of the spreadsheet into one or more online charging testing requests For example, the event mediation module 210 converts a test case row into an online charging testing procedure that includes one or more of provisioning requests, call testing requests, and/or validation of expected results requests.

In operation 525, when voice call requests are established, the system 120 sends the voice call requests to a message simulator. In operation 527, the message simulator provisions the voice call requests to emulate origination from a voice call network. For example, the voice call simulation module 220 may simulate or emulate the voice call flow requests generated by the event mediation module 210 as voice charging requests originating from a voice network, with respect to the online charging system 110. The voice call simulation module 220 may include some aspects of the Message Generator and Traffic Simulator™ (MGTS), by Ixia, which emulates SS7 and PSTN entities and application databases, or other simulators configured to test various networks and systems.

In operation 530, the system 120 sends the generated call requests to the online charging system 110 for simulation of the related test case. Once testing is complete, the system 120 receives a call detail record (CDR) file that includes results of performing simulations of the online charging system 120 using the call requests.

In operation 540, the system 120 converts the CDR file into CDR information to be provided to the spreadsheet 125, and updates the spreadsheet with the CDR information. Therefore, the automated testing system 120, in some embodiments, converts test case information into actionable requests to be simulated by the online charging system 110, and converts simulation result data into test case variables, to be provided to the spreadsheet 125 when updating the test cases with test results.

Figure 6:
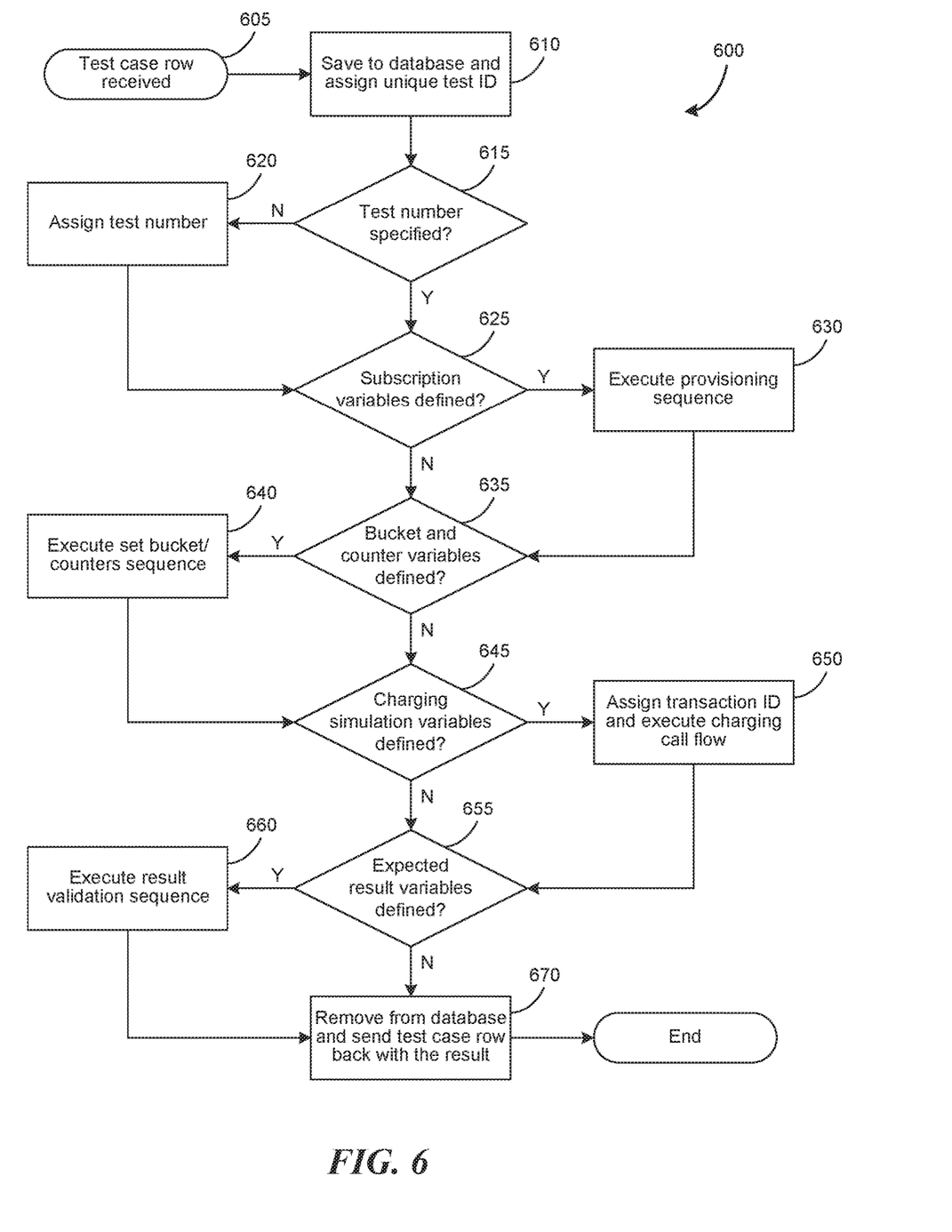
FIG. 6 is a flow diagram illustrating a method for performing a test of a charging system using a single test case.

To illustrate the simulation of a single test case, FIG. 6 is a flow diagram illustrating a method 600 for performing a test of a charging system. The method 600 may be performed by the automated testing system 120, and, accordingly, is described herein merely by way of reference thereto. It will be appreciated that the method 600 may be performed on any suitable hardware.

In operation 605, the system 120 receives a test case row from the spreadsheet 125. In operation 610, the system 120 saves the row to an associated database, and assigns the row a unique test identifier. In operation 615, the system 120 determines whether the test number is specified. When the test number is not specified, a test number, in operation 620, is assigned. When the test number is specified, the method 600 proceeds to operation 625, and the system 120 determine whether the subscription/plan variables are defined.

When the variables are defined, the system 120, in operation 630, executes a provisioning sequence, and proceeds to operation 635. When the variables are not defined, the system 120 proceeds to operation 635, and the system 120 determines whether the bucket/counter variables are defined. When the variables are defined, the system 120, in operation 640 executes a set buckets/counters sequence, and proceeds to operation 645. When the variables are not defined, the system proceeds to operation 645.

In operation 645, the system 120 determines whether the charging variables are defined. When the charging variables are defined, the system 120, in operation 650, assigns a transaction identifier, and executes a charging call flow. When the charging variables are not defined, the system 120 proceeds to operation 655. In operation 655, the system 120 determines whether expected result variables are defined. When the variables are defined, the system 120, in operation 660, executes a result validation sequence. When the variables are not defined, or when the result validation sequence is executed, the system 120, in operation 670, removes the data from the database, and sends the test result data to the spreadsheet for entry.

Therefore, the systems and methods described herein perform automated testing of online charging systems by converting, via the event mediation module 210, one or more rows of the spreadsheet 125 into one or more online charging testing requests, where each row of the spreadsheet is associated with a test case and includes one or more variables to be tested by the online charging system. The event mediation module 210 receives a call detail record (CDR) file that includes results of performing simulations of the online charging system 110 using the online charging testing requests, converts the CDR file into CDR information to be provided to the spreadsheet 125, and updates the spreadsheet with the CDR information.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims

I claim:

1. A system for testing a charging system associated with a telecommunications network, the system comprising:
   at least one hardware processor; and
   at least one memory, coupled to the processor, and storing processor-executable modules, including:
      a first module configured to create one or more charging testing requests from a data structure,
         wherein the charging testing requests include at least two of:
            provisioning flow requests to be tested by the online charging system,
            messaging flow requests to be tested by the online charging system,
            data session flow requests to be tested by the online charging system, or
            voice call flow requests to be tested by the online charging system; and
      a second module configured to:
         receive from the online charging system a results file that includes results of performing simulations of the charging system using the online charging testing requests, and
         update the data structure with charging information based on the results file.

2. The system of claim 1, wherein the first module is configured to:
   receive from the charging system test results that include results of performing simulations of the charging system using the charging testing requests;
   convert the results into charging information to be provided to the data structure;
   update the data structure with the charging information; and
   when the data structure includes expected results data for performing simulations of the charging system using a test case of which the charging testing requests are derived:
      compare the charging information with the expected results data; and
      determine whether the charging system operates correctly under the test case.

3. The system of claim 1, wherein the first module is configured to:
   receive from the charging system results of performing simulations of the charging system using the charging testing requests;
   convert the results into charging information to be provided to the data structure; and
   update the data structure with the charging information.

4. The system of claim 1, wherein each row of the data structure includes a first set of variables associated with charging parameter for a test case, a second set of variables associated with account tariff logic parameters for the test case, and a third set of variables associated with an expected result of simulating operation of the charging system with the test case.

5. The system of claim 1, wherein the first module converts input variables within the data structure into a predefined sequence of flow requests to be tested at the charging system.

6. The system of claim 1, further comprising a voice call simulation module configured to simulate voice call flow requests as voice charging requests originating from a voice network.

7. The system of claim 1, wherein the first module causes multiple different charging testing requests to be executed by the charging system simultaneously.

8. The system of claim 1, wherein the data structure includes a comma-separated values format of multiple rows of data, wherein each of the rows of data includes data representative of a test case to be simulated by the charging system.

9. The system of claim 1, wherein the charging system is configured to generate a call data record for every test case simulated by the charging system via the charging testing requests.

10. A method for testing a charging system associated with a telecommunications network, the method comprising:
    converting at least one row of a spreadsheet into at least one charging testing request,
       wherein each row of the spreadsheet is associated with a test case and includes at least one variable to be tested by the charging system, and
       wherein the charging testing request includes at least two of:
          provisioning flow requests to be tested by the charging system;
          messaging flow requests to be tested by the charging system;
          data session flow requests to be tested by the charging system; or
          voice call flow requests to be tested by the charging system;
    receiving from the charging system a results file that includes results of performing at least one simulation of the charging system using the charging testing request; and,
    updating the spreadsheet with the charging information based on the received results file.

11. The method of claim 10, further comprising:
    when the spreadsheet includes expected results data for performing simulations of the charging system using a test case of which the charging testing request is derived:
       comparing the charging information with the expected results data; and determining whether the charging system operates correctly under the test case.

12. The method of claim 10, wherein the charging testing request includes voice call flow requests to be tested by the charging system, and further comprising:
provisioning the voice call flow requests to be tested by the charging system into voice charging requests received by the charging system.

13. The method of claim 10, wherein the charging testing request includes voice call flow requests to be tested by the charging system, and further comprising:
simulating the voice call flow requests as voice charging requests originating from a voice network and received by the charging system.

14. The method of claim 10, wherein each row of the spreadsheet includes a first set of variables associated with a charging parameter for a test case, a second set of variables associated with account tariff logic parameters for the test case, and a third set of variables associated with an expected result of simulating operation of the charging system with the test case.

15. The method of claim 10, further comprising converting one or more rows of the spreadsheet into the at least one charging testing request, including converting input variables within the one or more rows of the spreadsheet into a predefined sequence of flow requests to be simulated by the charging system.

16. The method of claim 10, the converting includes converting multiple different rows of the spreadsheet into charging testing requests to be executed by the charging system simultaneously.

17. The method of claim 10, wherein the spreadsheet is a data structure having a comma-separated values format of multiple rows of data, wherein each of the rows of data includes data representative of a test case to be simulated by the charging system.

18. A non-transitory computer-readable medium whose contents, when executed by at least one data processor, tests an online charging system associated with a telecommunications network, comprising:
creating one or more charging testing requests from a data structure,
wherein the charging testing requests include at least two of:
provisioning flow requests to be tested by the online charging system,
messaging flow requests to be tested by the online charging system,
data session flow requests to be tested by the online charging system, or
voice call flow requests to be tested by the online charging system; and
receiving from the online charging system a results file that includes results of performing simulations of the charging system using the online charging testing requests; and
updating the data structure with charging information based on the received results file.

19. The computer-readable medium of claim 18, further comprising:
for all charging testing requests that are voice call flow requests to be tested by the charging system, simulating the voice call flow requests as voice charging requests originating from a voice network and received by the charging system.

* * * * *